(12) United States Patent
Lee

(10) Patent No.: US 7,741,786 B2
(45) Date of Patent: Jun. 22, 2010

(54) LIGHTING CONTROL WITH SEASON DETECT

(75) Inventor: Wade Lee, Danville, CA (US)

(73) Assignee: Illumination Dynamics LLC, Danville, CA (US)

( * ) Notice: Subject to any disclaimer, the term of this patent is extended or adjusted under 35 U.S.C. 154(b) by 59 days.

(21) Appl. No.: 11/619,043

(22) Filed: Jan. 2, 2007

(65) Prior Publication Data

US 2007/0153524 A1    Jul. 5, 2007

Related U.S. Application Data

(60) Provisional application No. 60/755,158, filed on Dec. 30, 2005.

(51) Int. Cl.
*H05B 37/02* (2006.01)

(52) U.S. Cl. .................... 315/157; 315/150; 315/159

(58) Field of Classification Search ......... 315/149–150, 315/156–159; 362/226, 276, 640–642
See application file for complete search history.

(56) References Cited

U.S. PATENT DOCUMENTS

| | | | | |
|---|---|---|---|---|
| 4,209,728 A | * | 6/1980 | Membreno | 315/159 |
| 4,937,499 A | * | 6/1990 | Hunte | 315/149 |
| 5,598,066 A | * | 1/1997 | Wiesemann et al. | 315/159 |
| 6,225,748 B1 | * | 5/2001 | Evans et al. | 315/159 |
| 6,927,541 B2 | * | 8/2005 | Lee | 315/159 |
| 2003/0062841 A1 | * | 4/2003 | Norling | 315/149 |
| 2005/0259416 A1 | * | 11/2005 | Gauna et al. | 362/227 |

* cited by examiner

*Primary Examiner*—David Hung Vu
*Assistant Examiner*—Tung X Le
(74) *Attorney, Agent, or Firm*—Elliot B. Aronson

(57) ABSTRACT

An outdoor lighting control method and apparatus for use with an outdoor lighting fixture that automatically detects the changing length of the day and provides for automatically turning off the light after a shorter period of illumination during shorter summer nights and after a longer period of illumination during longer winter nights. The control method measures the elapsed time interval over which night sets in, for example, by sensing light levels characteristic of the onset of dusk and the onset of night and measuring the elapsed time between the two sensed light levels, and then automatically turns on the lighting fixture for nighttime operation for a duration that depends on the measured elapsed night-onset time.

6 Claims, 2 Drawing Sheets

LIGHTING CONTROL WITH SEASON DETECT

BACKGROUND OF THE INVENTION

The present invention relates to outdoor lighting controls for automatically turning a light on and off at night and is more particularly directed to a control technique for adjusting the length of time a light stays on at night to take into account the variation in the length of the night with the seasons.

A popular form of outdoor lighting fixture turns itself on automatically at night. The lighting fixture includes a light sensor for detecting the presence of daylight. Some such lighting fixtures are able to operate in several different modes. In one mode, commonly called dusk-to-dawn mode, the fixture comes on automatically when the daylight sensor no longer senses the presence of daylight and turns off automatically when the sensor first begins to detect daylight at dawn. In another mode, commonly called accent mode, the lighting fixture comes on automatically at night at a reduced level of illumination so as to provide a low level of accent lighting. Such a mode is commonly used in conjunction with a motion detector. The lighting fixture comes on at nightfall at the reduced level of illumination, and then when motion is detected, the fixture comes on at the full-brightness level, returning to the reduced level of illumination shortly after motion is no longer detected.

Some models of outdoor lighting fixtures also include a switch, which allows the user to manually select the length of time the light stays on after it first turns on automatically. For example, the user may be presented with a choice of 3, 5 or 7 hours on-time or all night operation.

Other forms of switches are known which may be wired into the electrical circuit providing power to the outdoor lighting fixture. Such switches allow the user to manually set the times at which the lighting fixture turns on and off.

There is a problem with such control mechanisms, however, in those latitudes away from the equator where the length of the day (and night) varies with the season. In the summer months when the day is longer, the user may only want the lighting fixture to stay on for two or three hours. During the winter months when it may already be dark before dinnertime, the user may want the light to stay on for six or more hours. With the popular outdoor lighting fixtures presently available with automatic turn-on control, the user has to manually reset the on-time duration as the length of the day changes with the seasons.

SUMMARY OF THE INVENTION

The present invention provides an outdoor lighting control method and apparatus for use with an outdoor lighting fixture that automatically detects the changing length of the day and provides for automatically turning off the light after a shorter period of illumination during shorter summer nights and after a longer period of illumination during longer winter nights.

Briefly, the control method calls for automatically measuring the elapsed time interval over which night sets in, for example, by sensing light levels characteristic of the onset of dusk and the onset of night and measuring the elapsed time between the two sensed light levels. The light is then turned on automatically for nighttime operation for a duration that depends on the measured night-onset time.

Other aspects, advantages, and novel features of the invention are described below or will be readily apparent to those skilled in the art from the following specifications and drawings of illustrative embodiments.

DETAILED DESCRIPTION OF ILLUSTRATIVE EMBODIMENTS

Figure 1:
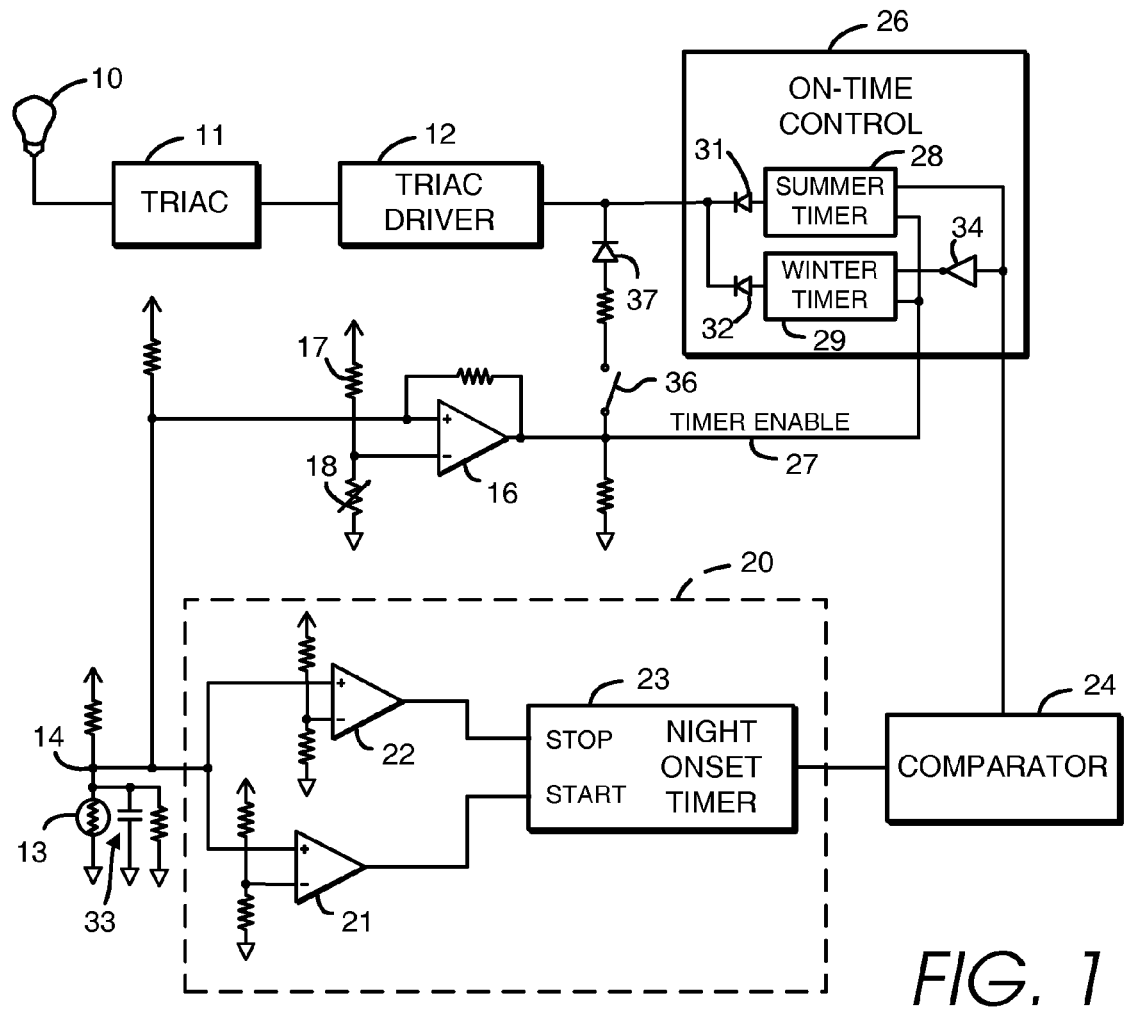
FIG. 1 is a block schematic diagram of a circuit showing a first embodiment of the invention.

FIG. 1 shows a first embodiment of the invention in a lighting fixture that operates in a simple on-off mode, in which a lamp 10 turns on automatically at or around nightfall and turns off automatically at some time later generally before dawn. Power to lamp 10 is switched on by a triac 11, which in turn is controlled by a triac driver 12. Although a triac and triac driver are shown here, the circuitry can readily be configured with a relay or other form of switching circuit, and no limitation to use with a triac is intended.

The circuitry includes a light sensor provided here by a cadmium sulfide (CdS) cell 13 for distinguishing day from night. Light sensor 13 is mounted within the lighting fixture so as to be exposed to ambient light and is capable of distinguishing a range of ambient light levels as the ambient light changes from daylight to night. In the case of the CdS cell illustrated in FIG. 1, the resistance of the cell increases as the illumination impinging on the cell decreases. The cell forms part of a voltage divider so that the voltage level at node 14 increases from a low level substantially at the circuit ground during ambient light levels typical of daylight to a higher voltage level typical of nighttime ambient light levels.

Light sensor 13, op amp 16 and the associated biasing resistors determine when it is sufficiently dark to turn the light on. The voltage level at node 14 is applied to the positive input of op amp 16. During daylight this voltage level is low, and it holds the output of op amp 16 low. As dusk sets in, the voltage level at node 14 rises and eventually surpasses the reference level at the negative input of op amp 16 set by resistors 17 and 18. The op amp then provides a High at its output signifying time for nighttime operation. In the embodiment of FIG. 1 resistor 18 is variable enabling the user to set the level at which op amp 16 provides its nighttime-operation High. As explained more fully below, by this mechanism the user may set the ambient light level at which light 10 is first turned on—for example, when it becomes fully dark or at a selected twilight ambient light level before the darkness of night fully sets in.

The circuitry at block 20 provides a measure of how slowly or how quickly night sets in. In the summer months darkness sets in more gradually than during the winter months. Block 20 provides a measure of how long it takes from the time dusk first begins to set in until it gets dark. A first comparator 21 determines the when the ambient light level has dropped to a first level characteristic of the onset of dusk. A second comparator 22 determines when the ambient light level has dropped to a second level, lower than the first level, characteristic of the onset of night. Night onset timer 23 then provides a measure of how long it has taken to pass from the first ambient light level to the second, for example, by providing a voltage signal proportional to the elapsed time. The measure of the night onset time from timer 23 is applied to comparator 24. In one implementation comparator 24 provides a comparison with a single threshold level, which represents the demarcation between summer and winter months. For night onset times with a measure greater than the threshold level (that is, a longer night onset time indicating a longer twilight period as in the summer) comparator 24 provides a first signal indicating the summer mode of operation, and for onset times with a measure less than the threshold level (a shorter night onset time indicating a shorter twilight period as in the winter) the comparator provides a second signal indicating the winter mode of operation. The signal from comparator 24 is passed to on-time control 26, which sets the length of time that the lamp 10 is energized. On-time control 26 provides a signal activating triac driver 12 for a shorter period of time if comparator 24 indicates a summer mode of operation and for a longer period of time if comparator 24 indicates a winter mode of operation.

Having given an overview of the circuit of FIG. 1, the operation of the circuit is now described in more detail. During daylight, light sensor 13 connects the positive input of op amp 16 essentially to the circuit ground, ensuring a Low signal at the output of op amp 16 on Timer Enable line 27. On-time control 26 includes two timers, summer timer 28 and winter timer 29, which establish the duration for which lamp 10 stays on during the summer and winter months. Line 27 is applied to on-time control 26 for enabling and disabling the timers 28 and 29. During daylight the Low on the line 27 disables both timers, which both then provide a Low output blocking diodes 31 and 32. This action disables triac driver 12, which in turn prevents lamp 10 from being turned on.

During daylight, light sensor 13 also disables comparators 21 and 22. When it first begins to get dark, that is, when dusk first begins to set in, the ambient light level drops and the voltage at the top of light sensor 13 (that is, at node 14) begins to rise. When the ambient light level has dropped below a first level set by the reference voltage on the negative input to op amp 21, the op amp provides a High signal at its output, which starts night onset timer 23. As the ambient light level drops further, the voltage at node 14 continues to rise until it surpasses the reference level on the negative input to op amp 22. Op amp 22 then provides a High at its output, signaling night onset timer 23 to stop. The night onset timer tracks the elapsed time between the START and STOP signals.

The reference voltage levels at op amps 21 and 22 correspond to first and second ambient light levels sensed by light sensor 13. The first reference voltage level is generally set to correspond to a level of darkness near the beginning of dusk. The second reference voltage level generally corresponds to a level of darkness characteristic of the onset of night. In general, the second level need not correspond to the full darkness of night, but may be something less than completely dark. It is sufficient that the second ambient light level be sufficiently less than the first ambient light level that the difference give a good measure of the earlier or later onset of darkness typical of the different seasons. The precise light levels, that is to say, the precise corresponding reference voltage levels, may readily be empirically determined so as to provide a characteristic measure of the speed with which night comes on once it starts to get dark.

A capacitor or RC network 33 may optionally be connected across light sensor 13 to allow for short variations in the ambient light level striking the sensor, for example, caused by a shadow temporarily falling on the sensor so as not to start the night onset timer prematurely.

It will be appreciated now that the light sensor need not be limited to a CdS cell. For example, silicon-based sensors such as phototransistor arrangements may also be used.

The night onset timer may be configured with either analog or digital circuitry. For example, the timer may be provided by an RC network that charges when a High appears at the output of op amp 21. The RC network may be connected to the output of op amp 21 through a transistor switch under the control of op amp 22 and configured such that a Low at the output of op amp 22 switches in the RC network enabling it to charge and a High at the output of op amp 22 switches out the RC network and maintains the charge level. The voltage level at the output of the night onset timer then provides a measure of the elapsed night onset time. This voltage level is then compared at comparator 24 with a reference level. If, for example, the night-onset time is greater than a half-hour, corresponding to a voltage level greater than the threshold reference level, comparator 24 provides a High signal. If the onset-time voltage level is less than the reference level, comparator 24 provides a Low signal.

On-time control 26 then determines how long the lamp is energized. A High signal from comparator 24 is applied to triac driver 12 through the summer on-time control 28, which may be configured with an RC network having a characteristic time constant of, say, four hours, and which deasserts the High on triac driver 12 four hours after the summer control is enabled by a High on Timer Enable line 27. The High from comparator 24 also passes through inverter 34 to apply a disabling Low to the winter on-time control 29. A Low from comparator 24 has the opposite effect. The Low disables summer on-time controller 28 and through inverter 34 asserts a High to triac driver 12 while enabling an RC network with a characteristic time constant of, say, six hours, which then deasserts the High on triac driver 12 six hours after the winter control is enabled by the High on Timer Enable line 27. This embodiment of summer and winter on-time controls 28 and 29, which are coordinated through inverter 34, is offered by way of example. Given these examples, those of routine skill will readily be able to provide other circuit configurations for providing a logic High to the triac for the appropriate duration as indicated by the signal or signals from comparator 24.

For completeness the circuit of FIG. 1 also shows a dusk-to-dawn switch 36, which bypasses on-time control 26 and enables the lamp 10 to turn on at dusk and remain on until dawn. At dusk the High output from op amp 16 is applied directly to triac driver 12 through diode 37 turning on lamp 10. The lamp remains on until the output of op amp 16 goes low when daylight returns. When switch 36 is closed, the High passed through diode 37 at night overrides any High or Low signal from on-time control 26.

Figure 2:
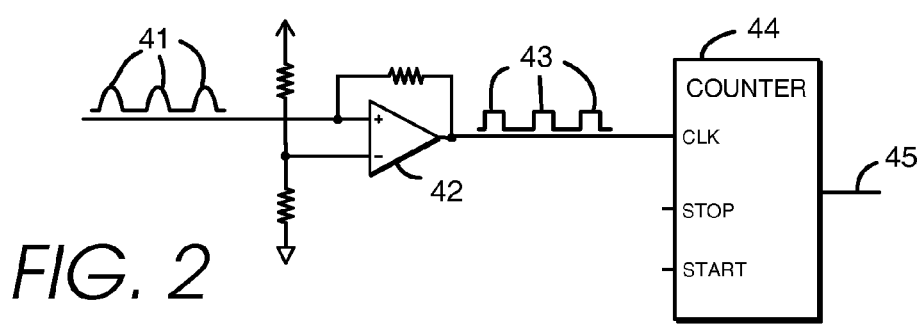
FIG. 2 is a circuit diagram showing an example digital timing implementation for use with the invention.

Night onset timer 23 and/or the timers 28 and 29 may also be configured digitally. A simple such arrangement for the night-onset timer is shown in FIG. 2. The AC line voltage is scaled down and half-wave rectified, for example, with a diode rectifier, to provide a train of clock pulses as indicated at reference numeral 41. The clock pulses are squared off by comparator 42 to provide a square clock pulse train 43. This pulse train is applied to the clock input (CLK) of an integrated circuit counter chip 44, which provides the time measures needed for the night onset timer 23 and summer and winter timers 28 and 29. For example, the counter may provide a digital word at its output on line 45 representing the measured elapsed time between START and STOP pulses. In this embodiment comparator 24 compares the word with the summer/winter threshold value. The summer and winter timers 28, 29 may be provided by digital countdown timers responsive to a pulse of proper polarity from comparator 24.

In the simple embodiments described thus far comparator 24 has defined only a single reference value dividing the system response into a summertime response and a winter-time response. In other embodiments a plurality of comparator reference levels may be used so that the on-time control causes the lamp to be energized for more than two predetermined on-time durations as the night-onset time varies with the seasons. For example, the system response can provide three on-time durations—one for summer, one for winter and one for spring and fall. For northern latitudes it may be desirable to provide four on-time durations, for example, for when dusk begins between four and six o'clock, between six and eight o'clock, between eight and ten o'clock, and after ten o'clock. Even more on-time durations may be used for further fine-tuning the correspondence between night onset and on-time duration.

Each predetermined on-time duration is associated with a corresponding interval of night-onset times, namely, those night-onset times having a measure (e.g., a night-onset voltage level) falling between two successive comparator reference levels. For example, an on-time duration of eight hours may correspond to a night-onset time of twenty minutes or less, which corresponds in turn to a night-onset voltage level equal to or less than the first (lowest) comparator reference level. An on-time duration of six hours may correspond to a night-onset time greater than twenty minutes but less than or equal to forty minutes, which corresponds in turn to a night-onset voltage level greater than the first, but less than or equal to the second comparator reference level. An onset duration of four hours may correspond to a night-onset time greater than or equal to one hour, which corresponds in turn to a night-onset voltage level greater than or equal to the second comparator reference level. In this way the pre-defined comparator reference levels establish pre-defined night-onset time intervals. Each interval corresponds to the range of night-onset voltage levels falling between two adjacent comparator reference levels. On any given evening the measured elapsed night-onset time will fall within one of these pre-defined reference time intervals. The lamp is then turned on for the predetermined on-time duration associated with the reference time interval that includes the measured elapsed night-onset time. Comparator 24 provides an appropriate signal indicating which of the predetermined on-time durations is to be activated. The comparator may be configured in many ways to achieve this purpose. For example, the comparator output signal may take the form of a multi-level voltage signal, or an appropriate digital word, or a multiplexed signal, or may even provide a plurality of signals along a plurality of output lines.

To achieve the desired object of having the lamp stay on longer when night falls earlier, the association of on-time durations with pre-defined night-onset time intervals should be such that longer on-time durations correspond to shorter night-onset time intervals. More generally, the on-time duration is monotonically increased as the measured elapsed time decreases. The term "monotonically increased" is borrowed from the field of mathematics to describe the general relation between the night-onset time, i.e., the measured elapsed time between first and second ambient light levels, and the lamp on-time duration, i.e., the duration for which the lamp is turned on at night. The on-time duration increases monotonically if it increases or remains constant (but does not decrease) as the measured elapsed night-onset time decreases. Stated differently, the on-time duration is said to increase monotonically if it increases stepwise or continuously or a combination of stepwise and continuously, just so long as it does not significantly decrease, as the measured elapsed night-onset time decreases.

Up to this point the invention has been described in the example of a lighting fixture that comes on automatically at full brightness at around dusk and turns off automatically at a later time before dawn according to how fast nighttime sets in. The fixture can also be configured so that the light comes on at something less than full brightness. For example, the lighting fixture may alternatively be turned on at a reduced, background lighting level sometimes referred to as accent lighting. As used herein, background lighting level means any level that is generally perceived as dimmer than full brightness level, for example, a background level such as commonly found in two-level motion-activated lighting systems. Such a background level is commonly referred to as accent lighting and is commonly used for decorative purposes to illuminate landscape or architectural features or to illuminate garden pathways. It is generally desired to use dim background lighting for such purposes, and it is often desired that such lighting be turned on only for a limited duration during the evening hours. By means of the present invention such accent lighting can be turned on and off automatically with the turnoff time being adjusted automatically as night sets in earlier or later.

Figure 3:
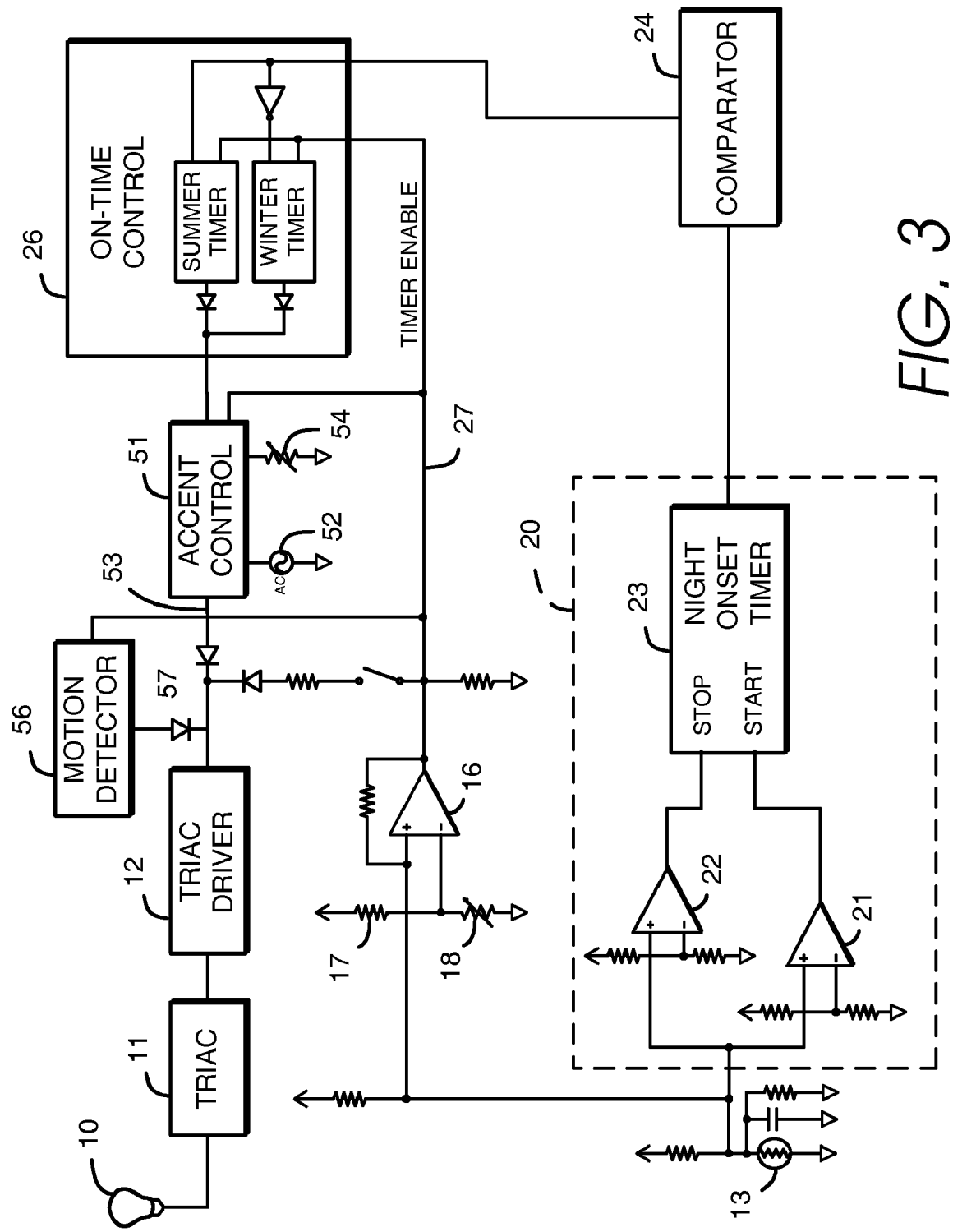
FIG. 3 is a block schematic diagram of a circuit showing an embodiment of the invention used in a motion-activated lighting fixture with accent mode.

FIG. 3 shows an embodiment of the invention in a lighting fixture with a motion detector and an accent lighting mode. Accent control block 51 causes lamp 10 to be turned on at a dim accent lighting level. The 60-hertz signal from the power lines, indicated generally at reference numeral 52, is scaled down and applied to block 51, which derives from it a pulsed output signal, provided on line 53, with pulses having only a fraction of the width of the 60-Hertz signal. This pulse train is applied, in known fashion, to triac driver 12 to fire triac 11 during only a fraction of the AC half-cycle, thus energizing lamp 10 for only a fraction of each AC half-cycle causing the lamp to appear only dimly lit. The amount of the dimming may be adjusted at potentiometer 54. Such accent mode circuitry is well-known and need not be described in any detail here. Timer Enable line 27 is also applied to block 51 to enable the accent mode of operation. In this manner the accent mode is turned off during the daytime. At night the output from on-time control 26 is applied to block 51 to activate the accent mode of operation for only the prescribed on-time duration.

FIG. 3 also shows a motion detector for turning on lamp 10 in response to the detection of motion at night. Block 56 represents a motion detector that provides a signal at its output on line 57 when motion of a person in the field of view has been detected. That output is applied to triac driver 12 to turn on lamp 10 at its full brightness level. Timer Enable line 27 is also applied to block 56 to disable the motion detector during daylight. The structure and operation of motion detector circuitry are well-known in need not be described in any detail here. The overall circuitry of FIG. 3 operates as follows. During the daylight the output of op amp 16 on line 27 disables the triac driver and keeps the lamp off. As night sets in, the elapsed night-onset time is measured at block 20 and the proper on-time duration is established by comparator 24 and on-time control 26. At the selected level of darkness, determined by the setting of potentiometer 18, on-time control 26, accent mode control 51, and motion detector 56 are all enabled. Lamp 10 comes on at the accent level and remains on at that level for the on-time duration and turns off after that duration. If motion is detected at any time during the night, lamp 10 comes on at its full brightness level and remains on so long as motion is detected. After motion ceases, lamp 10 returns to the accent illumination level if it is still within the on-time duration or goes out completely if it is beyond the on-time duration.

The above descriptions and drawings are given to illustrate and provide examples of various aspects of the invention in various embodiments. It is not intended to limit the invention only to these examples and illustrations. The various timers, counters, comparators and other circuit elements can be implemented in a large number of analog and digital circuit embodiments too numerous to illustrate or describe here. Such alternative implementations will readily occur to the ordinary practitioner in the art given the above examples and explanations. Moreover, the above-described functions may also be implemented in software embodiments, in which the light sensor signal is converted to digital form and provided to a microprocessor or other form of programmable controller, which can readily be programmed to perform the timing, counting and comparing functions described herein and to provide an appropriate output signal for turning the light on at the desired illumination level and for turning the light off at the appropriate time. Thus, given the benefit of the above disclosures, those skilled in the art will be able to devise numerous such modifications and alternate constructions that although differing from the examples disclosed herein nevertheless enjoy the benefits of the invention and fall within the scope of the invention. Any limitation in the claims expressly using the wording "means" or "step for" is intended to be interpreted as a "means plus function" limitation in accordance with Title 35, United States Code, Section 112, and any claim limitation not expressly using such wording is not intended to be so interpreted.

What is claimed is:

1. A method of controlling a duration for which an outdoor lighting fixture remains on at night, the lighting fixture including a light sensor for distinguishing day from night, said light sensor capable of distinguishing a range of ambient light levels, the method comprising:

measuring the elapsed time between said sensor detecting a first ambient light level characteristic of the onset of dusk and a second ambient light level characteristic of the onset of night; and turning on said lighting fixture automatically at night for said duration determined by said elapsed time, said duration being monotonically increased as the measured elapsed time decreases.

2. The method of claim 1 wherein said lighting fixture is turned on for said duration at substantially full brightness.

3. The method of claims 1 wherein said lighting fixture is turned on for said duration at a background lighting level substantially less than full brightness.

4. The method of claim 1, further comprising: establishing a plurality of pre-defined reference time intervals;

wherein said lighting fixture is energizable for one of a plurality of predetermined durations, each said predetermined duration being associated with a corresponding one of said reference time intervals, wherein longer predetermined durations correspond to shorter reference time intervals; and turning on said lighting fixture for the predetermined duration associated with the reference time interval containing said measured elapsed time.

5. The method of claim 1 wherein said lighting fixture is turned on for a first duration when said elapsed time is greater than a threshold value and is turned on for a second duration longer than said first duration when said elapsed time is less than said threshold value.

6. The method of claim 1 further comprising:

turning on said lighting fixture at an ambient light level independent of said first and second ambient light levels.

* * * * *